United States Patent
Vaskinn et al.

(10) Patent No.: US 10,691,847 B2
(45) Date of Patent: Jun. 23, 2020

(54) REAL-TIME DAMAGE DETERMINATION OF AN ASSET

(71) Applicant: SAP SE, Walldorf (DE)

(72) Inventors: Asle Heide Vaskinn, Melhus (NO);
Tomas Manik, Trondheim (NO);
Runar Heggelien Refsnaes, Trondheim (NO)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 15/589,099

(22) Filed: May 8, 2017

(65) Prior Publication Data
US 2018/0202892 A1 Jul. 19, 2018

Related U.S. Application Data

(60) Provisional application No. 62/446,374, filed on Jan. 14, 2017, provisional application No. 62/446,033, filed on Jan. 13, 2017.

(51) Int. Cl.
*G01M 5/00* (2006.01)
*G01M 15/14* (2006.01)
*G06F 30/20* (2020.01)
*G06F 30/23* (2020.01)
*G06F 111/02* (2020.01)
(Continued)

(52) U.S. Cl.
CPC ........... *G06F 30/20* (2020.01); *G01M 5/0008* (2013.01); *G01M 5/0033* (2013.01); *G01M 5/0041* (2013.01); *G01M 5/0066* (2013.01); *G01M 15/14* (2013.01); *G06F 30/23* (2020.01);
(Continued)

(58) Field of Classification Search
CPC ............ G06F 17/5009; G06F 2217/06; G06F 2217/04; G06F 2217/02; G01M 5/0066; G01M 5/0041; G01M 5/0008; G01M 15/14; G01M 5/0033
See application file for complete search history.

(56) References Cited

U.S. PATENT DOCUMENTS 5,754,122 A * 5/1998 Li ........................... G08C 13/02
340/870.03
5,847,668 A * 12/1998 Morita ..................... G07C 3/00
341/132
(Continued)

OTHER PUBLICATIONS

Nilsson,Lifetime Monitoring of Wind Turbines (Year: 2005).*
(Continued)

*Primary Examiner* — Mohammad K Islam
(74) *Attorney, Agent, or Firm* — Buckley, Maschoff & Talwalkar LLC

(57) ABSTRACT

Provided are devices and methods for monitoring a physical asset in real-time based on simulated data being transformed and applied to a virtual asset corresponding to the physical asset. In one example, the method includes receiving a data stream acquired from a structure of an asset being monitored, determining an accumulated damage amount to the asset based on the received information, the determining including performing an incremental rainflow counting algorithm on the received data stream from the asset being monitored, stress transfer function evaluations, and damage calculations with S-N curves, and outputting information concerning the accumulated damage amount of the asset for display on a display device.

17 Claims, 13 Drawing Sheets

(51) Int. Cl.
  *G06F 111/04* (2020.01)
  *G06F 111/20* (2020.01)

(52) U.S. Cl.
  CPC ....... *G06F 2111/02* (2020.01); *G06F 2111/04* (2020.01); *G06F 2111/20* (2020.01)

(56) References Cited

U.S. PATENT DOCUMENTS

| | | | | |
|---|---|---|---|---|
| 2006/0116847 | A1* | 6/2006 | Plotts | G01K 3/04 702/136 |
| 2010/0100337 | A1* | 4/2010 | Vichare | G06F 11/008 702/34 |
| 2010/0174576 | A1* | 7/2010 | Naylor | G06Q 10/04 701/31.4 |
| 2011/0137575 | A1* | 6/2011 | Koul | G05B 23/0245 702/34 |
| 2011/0271761 | A1* | 11/2011 | Grieu | G01M 7/025 73/577 |
| 2013/0245879 | A1* | 9/2013 | Armijo Torres | G01M 5/0008 701/31.9 |
| 2014/0324377 | A1* | 10/2014 | Fenn | G01M 17/00 702/113 |
| 2014/0336954 | A1* | 11/2014 | Bruyneel | G01M 5/00 702/34 |
| 2015/0007666 | A1* | 1/2015 | Tucker | G05B 23/0283 73/787 |
| 2015/0039248 | A1* | 2/2015 | Meis | G01M 7/025 702/42 |
| 2015/0081121 | A1* | 3/2015 | Morgan | F02C 9/00 700/287 |
| 2015/0159867 | A1* | 6/2015 | Patrick | F23M 11/00 702/182 |
| 2015/0330317 | A1* | 11/2015 | Lee | F02D 28/00 701/102 |
| 2016/0320262 | A1* | 11/2016 | Unuma | G01M 13/00 |
| 2016/0370259 | A1* | 12/2016 | Loverich | G01M 13/00 |
| 2017/0276730 | A1* | 9/2017 | Sabate | H03F 3/2178 |
| 2018/0142674 | A1* | 5/2018 | Hammerum | F03D 7/0292 |
| 2018/0171861 | A1* | 6/2018 | Tan | F01P 11/14 |
| 2018/0187650 | A1* | 7/2018 | Byreddy | F03D 7/0292 |
| 2018/0223808 | A1* | 8/2018 | Spruce | F03D 7/0292 |
| 2018/0292290 | A1* | 10/2018 | Hoskins | G01M 3/2815 |
| 2019/0033152 | A1* | 1/2019 | Mori | G01L 7/18 |

OTHER PUBLICATIONS

Marsh et al., Review and application of Rainflow residue processing techniques for accurate fatigue damage estimation (Year: 2016).*

* cited by examiner

US 10,691,847 B2

REAL-TIME DAMAGE DETERMINATION OF AN ASSET

CROSS-REFERENCE TO RELATED APPLICATIONS

This application claims the benefit under 35 USC § 119(e) of U.S. Provisional Patent Application No. 62/446,033, filed on Jan. 13, 2017, and U.S. Provisional Patent Application No. 62/446,374, filed on Jan. 14, 2017, filed in the United States Patent and Trademark Office, both of which are incorporated herein by reference for all purposes.

BACKGROUND

With the recent development of the Internet of Things (IoT), simulation or virtual modeling has rapidly grown in the fields of energy (e.g., oil platforms, wind turbines, power plants, solar panels, etc.), healthcare (e.g., diagnostic equipment, treatment equipment, etc.), transportation (e.g., aircraft, locomotives, automobiles, etc.) as well as many others. A digital twin, or a virtual model, refers to a computerized model that corresponds to a real physical asset such as a product, process, or service. The digital twin is often generated based on data received from the physical asset. Here, the data can be obtained from sensors installed on the physical asset which may be used to model a status, working condition, and position of the physical asset in virtual space. This pairing of the virtual and physical worlds allows analysis of data and monitoring of physical assets to address problems before they even occur, prevent downtime, develop new opportunities, and plan for the future based on simulations.

The digital twin is often meant to be an up-to-date and accurate digital replica of the properties and states of the corresponding physical asset, which may include one or more of shape, position, gesture, status, and motion. However, related art virtual modeling approaches are limited in number, type and location of physical sensor installations within a physical structure. Another issue with acquiring data from physical sensors such as accelerometers, gauges, motion sensors, and the like, attached to the asset is that the physical sensors cost money to acquire, install, and maintain. Furthermore, sensor data can be vast and difficult to sift through in real-time. Currently, sensor analysis does not provide sufficient real-time analysis of sensor readings and results in a poor assessment of the state of a physical structure at a given time. In addition, preprogrammed and simplified (generic) mathematical algorithms used for digital conversion and structure analysis become inadequate upon changed needs or conditions, for example, when the physical structure begins to deteriorate or complex scenarios develop in and around the physical asset. Accordingly, what is needed is an improved way of monitoring and diagnosing a physical asset through a virtual asset in real-time.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
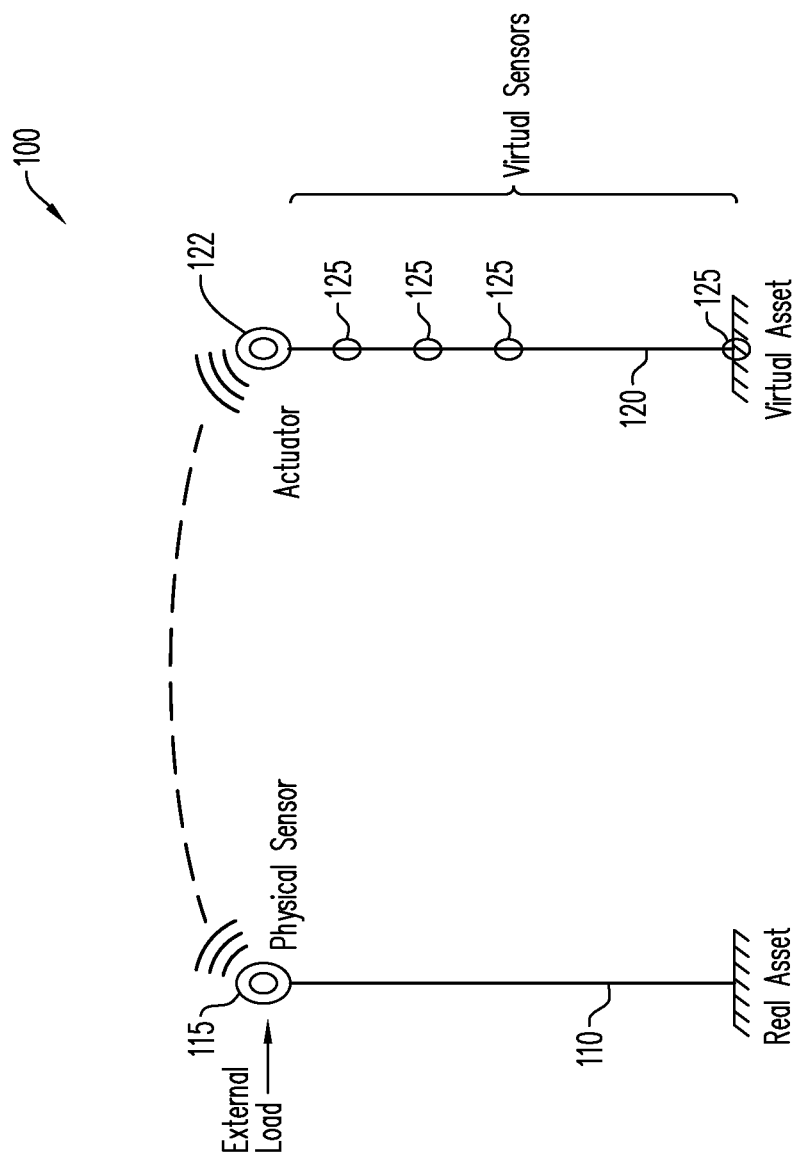
FIG. 1 is a diagram illustrating a simulation system including a real asset and a virtual asset based thereon, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments relate to a system and method for performing real-time structural analysis of a physical asset based on simulations performed on a virtual model (also referred to as a digital twin) of the physical asset. The asset may be any type of asset used that may be included in an Internet of Things (IoT) environment or a stand-alone environment, and may include, for example, a wind turbine, a crane, a winch, an oil platform, an aircraft, a locomotive, a gas turbine, a building, a bridge, another structure, and the like. It should be appreciated that the type of asset is not limited. Data may be detected from the physical asset, for example, based on one or more physical sensors placed on or about the asset. The sensors may include proximity sensors, accelerometers, temperature, pressure, image, gas, chemical, gauges, and others. In one example, the sensor data may be acquired by multiple sensors attached at various locations dispersed throughout a surface of the physical asset. The sensor data from the real asset may be used to generate and apply a virtual force to a corresponding virtual asset. The virtual force may be used to mimic the force being applied to the real asset. Accordingly, monitoring and analysis may be performed on the virtual asset to determine corrective action and problems associated with the physical asset.

Related art monitoring approaches are limited in the number, type and location of physical sensor installations on a physical structure. For example, a person typically has access to the top of a wind turbine where the power supply is located. However, it may be difficult to gain access to the rotor and the blades of the wind turbine, especially while the wind turbine is active. In addition to the difficulty accessing locations on the asset, physical sensors can be expensive to acquire, install, and maintain. Therefore, from a monitoring perspective, hardware monitoring can be costly and difficult to adequately measure all areas of an asset. From a software perspective, current technology does not provide sufficient real-time analysis of sensor readings and thus creates a poor assessment of the state of a structure in real time. In addition, preprogrammed and simplified (generic) mathematical algorithms can become inadequate when conditions change or complex scenarios associated with the asset occur.

The example embodiments include an application that performs an enhanced and faster algorithm for identifying real-world forces occurring on an asset and applying these forces to a virtual asset. Furthermore, the application provides an enhanced method for detecting damage to the virtual asset in real-time based on an improved rainflow counting algorithm. The improvements enable the use of a reduced amount of sensors on a physical structure in comparison to previous monitoring techniques thus reducing sensor hardware costs, installation costs, and maintenance costs. Data from the physical sensors may be transformed into virtual information (e.g., motion, translation, rotation, position, etc.) and applied to a structure of a corresponding virtual asset in real-time. For example, the data sensed from the physical asset may be used to generate and apply a virtual force to the virtual asset that mimics the real world force being applied to the physical asset.

In the simulated environment, virtual sensors may be used to detect translations, rotations, stresses, etc. that occur on the virtual structure of the virtual asset. The virtual sensors can be placed anywhere along the virtual asset and can be used to acquire data from the simulation. One of the advantages of the virtual asset is that there are no hardware, installation, or maintenance costs associated with adding virtual sensors. Accordingly, as many virtual sensors as desired can be added without increasing costs significantly. Furthermore, virtual sensors can be added at locations on the virtual asset that differ from locations at which physical sensors are located on the physical structure. For example, virtual sensors can be added to places on the virtual asset that can't be accessed in the real world on the physical structure (e.g., inside of a beam made of steel, etc.).

Based on the data sensed by the virtual sensors, the example embodiments perform a damage assessment that can be correlated to damage occurring on the physical asset. When monitoring a virtual asset in real-time a significant amount of sensor data may be generated, and at a continuous rate. Therefore, in order to calculate damage to the virtual structure in real-time, the equation must be quick and efficient. The example embodiments may perform a rainflow counting damage/fatigue analysis in a sliding time window rather than conventional rainflow counting algorithms which perform analysis based on an entire sequence of time series data. For example, the rainflow counting algorithm according to various embodiments may identify a beginning and an end of each stress cycle within the monitoring sequence of the virtual asset, in real time. As a result, less information is needed to make a damage assessment in comparison to related monitoring approaches.

Traditional monitoring approaches are limited in number, type and location of the physical sensor installations. In addition, insufficient real-time analysis of sensor readings gives poor assessment of the state of a structure at a given time. In addition, preprogrammed and simplified (i.e., generic) mathematical algorithms become inadequate upon changed needs or conditions such as degradation or partial collapse of the structure or complex scenarios. The example embodiments provide a real-time simulation-based system monitoring that has numerous advantages. For example, the system provided herein includes a reduced number and type of physical sensors that reduces sensor hardware, installation and maintenance costs. Virtual sensors can be placed at any component in the virtual model without additional costs, as along as the overall motion of the component is covered by a physical sensor. Virtual sensors can be of different types than the physical sensors attached to the physical structure. Examples of physical and virtual sensors include motion, force and moment sensors or strain gauges. Virtual sensors can be added remotely to the monitoring system at any time, without interrupting the operation. As a result, a re-analysis based on historical data is capable of being performed for locations which have not previously been considered. In addition, virtual sensors can be placed at locations which might not be accessible by physical sensors on a real asset, such as on individual components, within components, and the like.

The physical sensor measurements acquired from the real asset may be processed onsite or in a remote environment (e.g., a cloud computing environment) in a real-time structural analysis via a multi-body simulation based on a corresponding virtual asset. Readings from virtual sensors sensing data from and about the virtual asset may be extracted from the simulation model and made available for an online access system. Measurements from virtual sensors can be extracted with a same format, type and communication protocol as measurements taken from physical sensors of traditional monitoring solutions. Accordingly, existing programs and user interfaces can still be used, replacing feed from physical sensors by feed from virtual sensors. Real-time data feed and analysis enables operational decision making. Control actions such as yawing direction of a wind turbine can be simulated in advance of a control decision, considering consequences for both power production and structural lifetime. In addition, by recording an accurate and reliable history of structural responses (overview over extreme and fatigue events) enables cost-efficient prolongation of life beyond design lifetime.

FIG. 1 illustrates an example of a simulation system 100 including a real asset 110 and a virtual asset 120 based thereon, in accordance with an example embodiment. In this example, the real asset 110 is a wind turbine, however, the embodiments are not limited thereto and the asset may be any desired asset or structure such as a bridge, a crane, a winch, a platform, a rig, and the like. The software described herein (e.g., application, program, service, code, etc.) is based on the principle of observations and stimulations. Observations may be made by physical sensor 115 measurements taken from the real asset 110. Actuator 122 motions may be generated in a virtual environment according to the physical sensor measurement data and applied in a simulation model to the virtual asset 120 by stimulating the virtual asset 120 with a corresponding force. In the example of the system of FIG. 1, the real asset 110 is a physical system in the real world. In contrast, the virtual asset 120 (also referred to as digital twin) is a numerical model established by a simulation software. That is, the virtual asset 120 is a digital copy or replica of the real asset 110 and may have the same dimensions, material properties, constraints, etc. as the real asset 110. According to various embodiments, the virtual asset 120 may be a numerical representation of the real asset 110 and may follow or otherwise mimic its motions and dynamical behavior.

Although not shown in FIG. 1, the virtual asset 120 may be generated and displayed by a computing device that is executing the software described according to various embodiments. For example, the computing device may be a desktop computer, a laptop, a tablet, a mobile device, a cloud computing system, a server, and the like. In some embodiments, the software may be executed by a first device (e.g., cloud system, server, etc.) and output to a display connected to or embedded within a second device (e.g., a user device) that is connected to the cloud system through a network such as the Internet, a private network, and the like. The computing device may receive sensor data from the physical asset via a network connection such as the Internet, a private network, and the like. The network connection may include one or more different connection types (e.g., cellular, satellite, wired, wireless, etc.) which may transmit a feed from the physical asset to the computing device in real-time.

Physical sensors 115 may be used to observe the response of the real asset 110 and may be used to measure the dynamical motions, material deformations, and the like, of the real asset 110. Likewise, virtual sensors 125 may be used to observe the response of the virtual asset 120 and measure the same motions and deformations. The physical sensors 115 can be of any physical kind (when installed on the real system), and likewise, the virtual sensors 125 can be any virtual kind (when placed on the digital twin). In some embodiments, the physical sensors 115 may be less in number than the virtual sensors 125. That is, the virtual sensors 125 may be placed at different and additional locations on the virtual asset 120 than the physical sensors 115 are placed on the real asset 110. Accordingly, the system 100 enables the virtual asset 120 to be monitored and analyzed at more locations and at a finer level than the real asset 110. Furthermore, the virtual sensors 125 may be different kinds or types of sensors than the physical sensors 115 included with the real asset 110, and are not limited to being of the same type as the physical sensors 115.

In the real world, actuators are devices which convert energy into motions such as a motor, and the like. In the simulation software, the actuator 122 is used to prescribe motions of a numerical model based on input data received from the measurements of the real asset 110. In the example of FIG. 1, observations may be made in the real world by physical sensor measurements, which are transferred to the numerical model of the digital twin. To perform the transform, actuators 122 may be placed on the virtual asset 120 and used to stimulate the virtual asset 120 with motions according to sensor measurements taken from the real asset 110. Furthermore, the virtual sensors 125 may determine stress and/or damage that occurs to the virtual asset based on the stimulation.

According to various embodiments, to establish a simulation-based system monitoring that is performed in real-time, a fast and accurate numerical solver is provided for the simulation model. Sensor measurements on the real asset 110 can trigger a numerical solver process in the simulation model, updating the state of the virtual asset 120. Hence, the solver process may be as fast as, or faster than, the sensor measurement sampling of the physical sensors to be capable of keeping track with the real system. Another aspect of the system 100 is the ability to predict structural responses based on future events. For example, by estimating the development of a future load situation, different control decisions can be simulated in advance of the performed actions, evaluating consequences for both power production and structural loading.

The system and method described herein may be used to perform real-time based structural analysis of a real asset based on analysis of a corresponding virtual asset. Data acquired from the real asset may be fed into the simulation model such as shown in FIG. 1, in real-time. The application may convert the physical measurements and other data acquired from the real asset into movement data or position data (e.g., rotations, translations, position, acceleration, etc.) in the virtual space. In order to stimulate the virtual asset, the application may create input data for the simulation model based on sensor data acquired from the real asset.

In various examples herein, the real asset may correspond to a wind turbine, a winch, a crane, a bridge, an oil platform, and the like, which is composed of materials such as metal, concrete, and the like. During processing of the data acquired from the real asset, the application may generate input data for the simulation model (e.g., the virtual asset) during a pre-processing step. In order to generate the input data, the application may determine a beam deformation of the real asset which may be used to identify virtual forces that can be used to drive the simulation model such that it mimics the behavior of the real asset. In some of the examples herein, position and movement data such as accelerometer data from the real asset is used to generate virtual position or movement data for the virtual asset. For example, acceleration data may be used to generate position data in the virtual environment. Although, it should be appreciated that other types of position and/or movement data may be used such as rotation, translation, acceleration, orientation, a fixed position, and the like. The transformation process uses information about a structure of the real asset to generate a transfer function that transforms the acquired data into movement data in the virtual environment. Based on the structure of the real asset, a determination of how the structure of the real asset reacts to movement (e.g., measured by accelerometers, motion sensors, etc.) can be mapped into position and movement data in the virtual environment.

Various embodiments provide a method for determining a deformed shape of a general beam using accelerometers. In this example, accelerometers (or other sensors) may be placed near a free end of a beam to determine the rotational and translational degrees of freedom of the free end ($R_x$, $R_y$, $T_x$ and $T_y$) ($R_x$, $R_y$, $T_x$ and $T_y$) for use in a finite element (FE) simulation where movement of other points on the elastically deformed beam can be determined. Because acceleration is essentially double differentiated position, one could in principle obtain the position by double integrating the acceleration data over time. However, white noise, which is intrinsically present in accelerometer data causes a drift in calculated position with root mean square (RMS) steadily increasing with time. Without any other possibility for recalibration of the absolute position (e.g., GPS signal, etc.) the accelerometer alone is not accurate enough to provide consistent results in determining position over a continued period of time.

According to various embodiments, instead of double integrating acceleration values provided by an accelerometer, the acceleration values can be used to calculate Euler angles representing orientation of the $\vec{g}$ vector. The Euler angles describe the orientation of a rigid body (e.g., a physical asset, a component of the physical asset, a structure, a bridge, etc.) with respect to a fixed coordinate system. For example, the orientation may be achieved by composing three elemental rotations about the axes of the coordinate system. The Euler angles are further filtered by a lowpass filter and then transformed into deflections by means of known geometric relations between angle and deflection of the free end of the beam. This procedure is state of the art for determining the quasi static deflections and angles of the beam end (also referred to as the 0th-eigenmode). For example, the determining of position and angles for higher order eigenmodes (up to 2nd) may be performed based on the following. In order to ultimately avoid drift problem, Euler angles may be calculated purely from accelerations (given by orientation of the $\vec{g}$ vector) without use of gyroscope. Angles representing higher order eigenmodes may be extracted by selective filtering (bandpass filter) combined with correction for linear accelerations superposed. The method may be based on two prerequisites, acceleration signals measured along three axes by an accelerometer mounted on a free end of a beam, and an FE-model of the structure of the beam.

In the examples provided for accelerometer data, different data may be expressed, measured and transformed back and forth within multiple different coordinate systems (CS) such as a coordinate system defined by the accelerometer ($CS_{accl}$), a coordinate system defined by the free end of the beam ($CS_{Beam}$), and a global (laboratory) coordinate system given by the ground ($CS_{glob}$). For the coordinate system defined by the accelerometer $CS_{accl}$, the acceleration signal measured by the accelerometer returns a sampling frequency $f_s$ along with three accelerations, $a_x$, $a_y$, and $a_z$, which are measured along three axes. In a static scenario, these three values represent the components of the $\vec{g}$ vector, as "seen" in the $CS_{accl}$. In a dynamic scenario, the measured accelerations will contain, in addition to the $\vec{g}$ vector, linear accelerations as a result of inertia forces acting on the body in motion.

The measured accelerations $a_x$, $a_y$, and $a_z$ uniquely define the two Euler angles which define transformation between $CS_{accl}$ and $CS_{glob}$. By knowing transformation angles between $CS_{accl}$ and $CS_{glob}$ and given that transformation between $CS_{accl}$ and $CS_{BT}$ is fixed (i.e. accelerometer is not moving with respect to the end of the beam), it is possible to determine the desired transformation angles between $CS_{glob}$ and $CS_{Beam}$. These Euler angles $R_x$ and $R_y$ describe orientation of the end of the beam in the global coordinate system. As another example, in the global coordinate system given by the ground $CS_{glob}$, the deflections $T_y$ and rotations $R_x$, $R_y$ are expressed. Also, rotations $R_x$, $R_y$ have the meaning of Euler angles defining transformation between $CS_{glob}$ and $CS_{Beam}$.

Beside the static deflection (0th eigenmode), the application may capture dynamic motion corresponding to the 1st eigenmode of the beam. In this case, the motion corresponding to the $1^{st}$ eigenmode of the beam is typically the most dominant periodic motion. Furthermore, in some embodiments the determination can be extended to include higher eigenmodes as well. For example, filtering may be performed on the Euler angles $R_x$, $R_y$ which are calculated from raw accelerations $a_x$, $a_y$, and $a_z$ by Equation (3) listed below.

In this example, the accelerometer shows accelerations $a_x$, $a_y$, and $a_z$ at a certain orientation of a rigid body (i.e., (i.e., $\sqrt{a_x^2+a_y^2+a_z^2}=g$, where $g\approx9.81$ m·s$^{-2}$). Euler angle $R_z$ is indeterminable from accelerations. In this example, Euler angles $R_y$ and $R_x$ are given by the following equations:

$$\begin{pmatrix} a_x \\ a_y \\ a_z \end{pmatrix} = R^T \cdot \begin{pmatrix} 0 \\ 0 \\ g \end{pmatrix} \quad \text{Equation 1}$$

Which leads to:

$$\begin{pmatrix} a_x \\ a_y \\ a_z \end{pmatrix} = \begin{pmatrix} -g\sin R_y \\ g\sin R_x \cos R_y \\ g\cos R_x \cos R_y \end{pmatrix} \quad \text{Equation 2}$$

This gives the solution for $R_y$ and $R_x$ as:

$$R_y = \arctan\left(\frac{a_y}{a_z}\right) \quad \text{Equation 3}$$

$$R_x = \arctan\left(-\frac{a_x}{\sqrt{a_y^2+a_z^2}}\right)$$

Figure 2A:
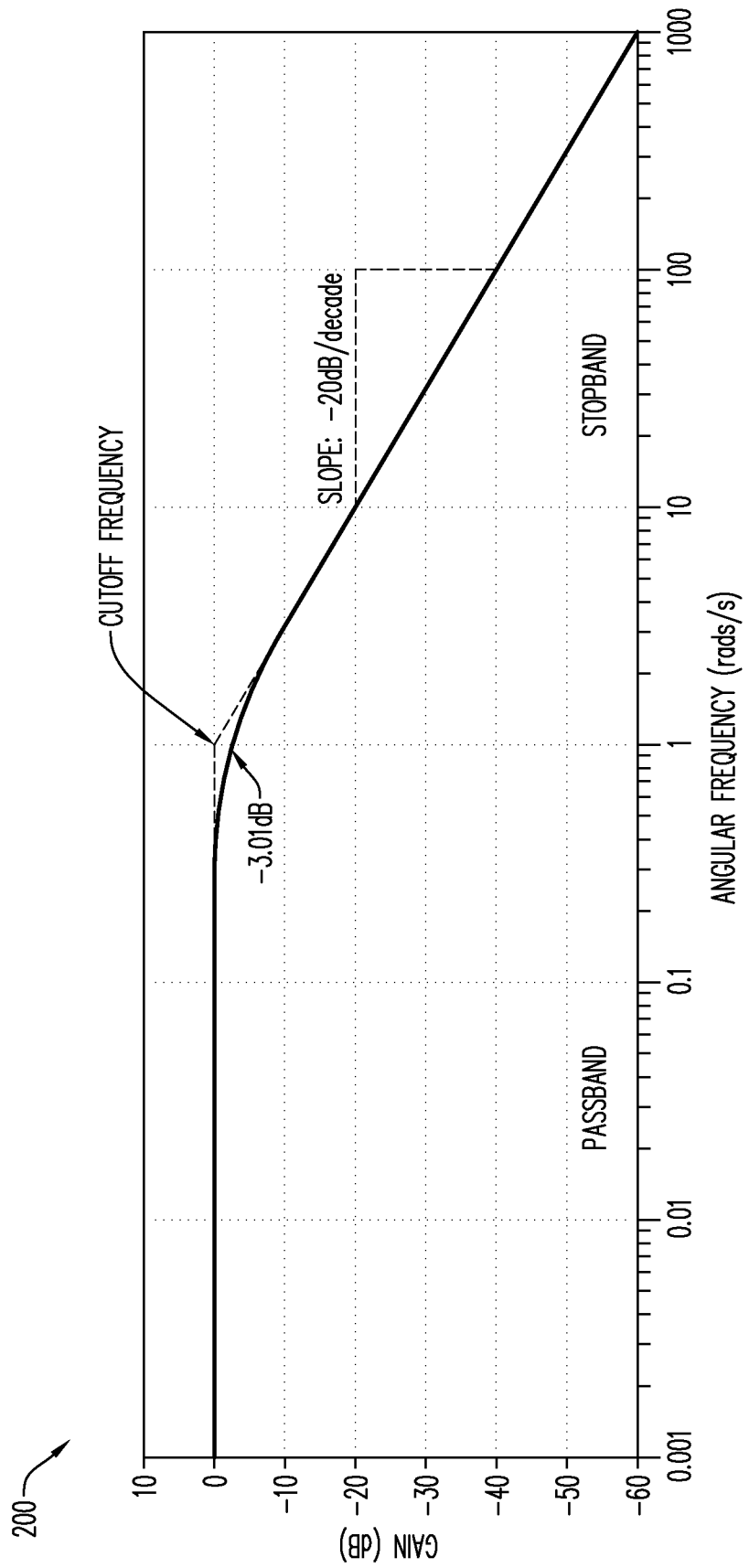
FIG. 2A is a diagram illustrating a frequency response function of a lowpass Butterworth filter of order 1, in accordance with an example embodiment.

The static (or quasi static, or 0th mode) motion is extracted from the signal by applying a lowpass filter (of Butterworth type) of 6th order with an appropriate cutoff frequency. In general, a lowpass Butterworth filter of $n^{th}$ order has frequency response given as:

$$G(\omega) = \sqrt{\frac{G_0}{1+(f/f_0)^{2n}}} \quad \text{Equation 4}$$

where $G_0$ is the gain at zero frequency (chosen equal to 1), is the cutoff frequency and n is the order of the filter. As shown in FIG. 2A, the Butterworth filter has a monotonically changing frequency response function with angular frequency $\omega$ ($\omega=2\pi f$) unlike other types of filters (Chebyshev type of filters, Elliptic filter, etc.) which have ripples in either passband or in stopband, or in both.

Figure 2B:
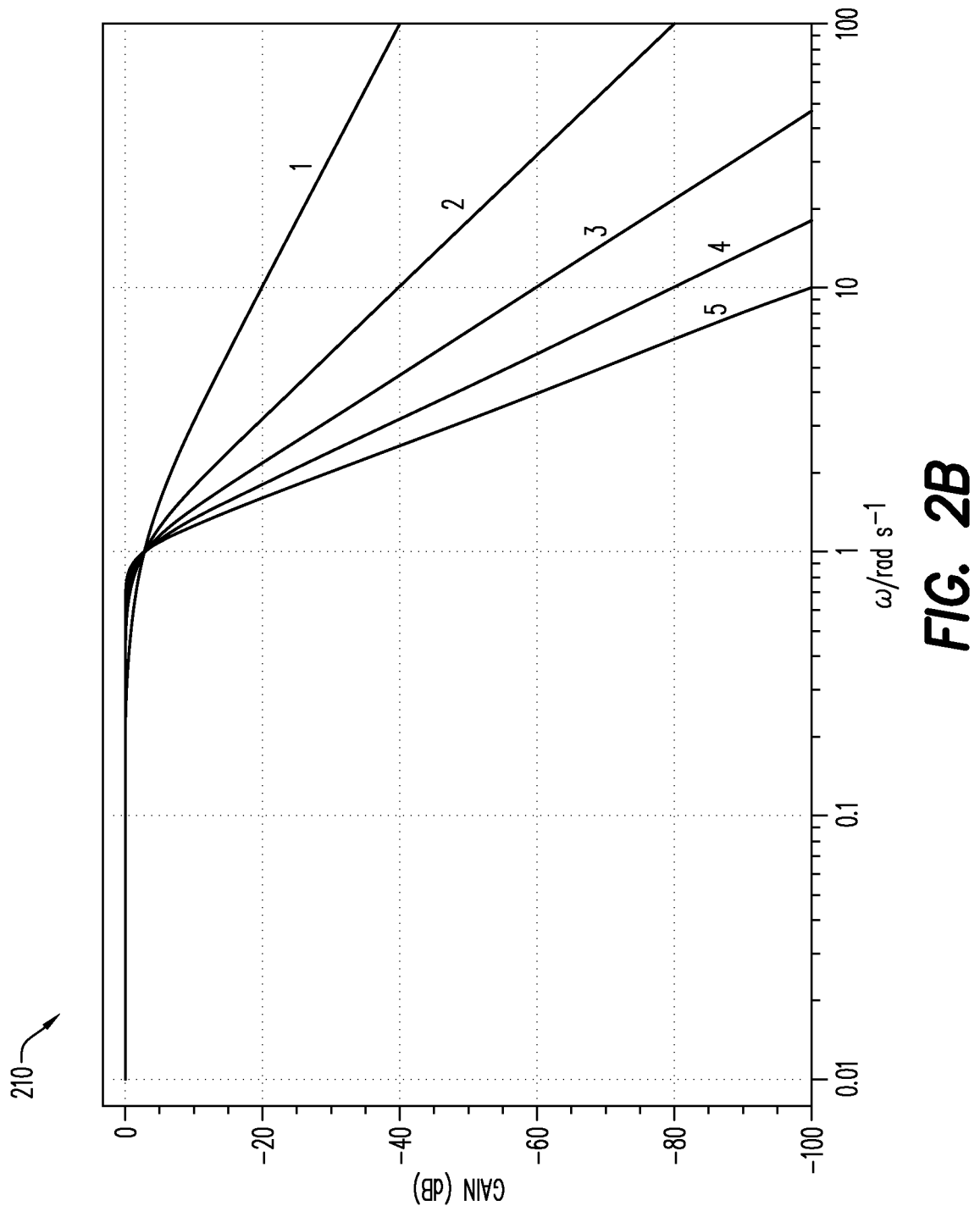
FIG. 2B is a diagram illustrating a plot of the gain of Butterworth low-pass filters of orders 1 through 5, in accordance with an example embodiment.

FIG. 2A illustrates a frequency response function 200 of a lowpass Butterworth filter of order 1, in accordance with an example embodiment, and FIG. 2B illustrates a plot of the gain 210 of Butterworth low-pass filters of orders 1 through 5, with cutoff frequency $\omega_c=1$, in accordance with an example embodiment. In the example of FIG. 2B, the slope is 20n dB/decade where n is the filter order. Frequency response is often plotted as gain in dB, which is defined as 10 $G^Z(\omega)$ is plotted in FIG. 2A. Two characteristics of a lowpass Butterworth filter are loss of gain at the cutoff frequency, which may be −3 dB. This corresponds to 1/$\sqrt{2}\approx0.707$ loss of amplitude of motion at the cutoff frequency. This is independent of order of the filter. The other characteristic is roll-off in stopband, which is 20n dB/decade, which corresponds to attenuation of amplitude with factor $10^{-n}$ per decade (e.g. amplitude of motion with frequency 10 times higher will be attenuated $10^n$ times more).

In some embodiments, the 1st eigenmode motion may be extracted from signal data by means of bandpass Butterworth filter of order 3 with low and high cutoff frequencies $f_c^L$ and $f_c^H$. The frequency response function for a band pass filter is:

$$G(\omega) = \sqrt{\frac{G_0}{1 + (f/f_0^L)^{2n}}} \sqrt{\frac{G_0}{1 + (f_0^H/f)^{2n}}} \quad \text{Equation 5}$$

Here, a good choice of $f_c^L$ and $f_c^H$ preserves as much of the 1st eigenmode amplitude as possible.

Figure 3:
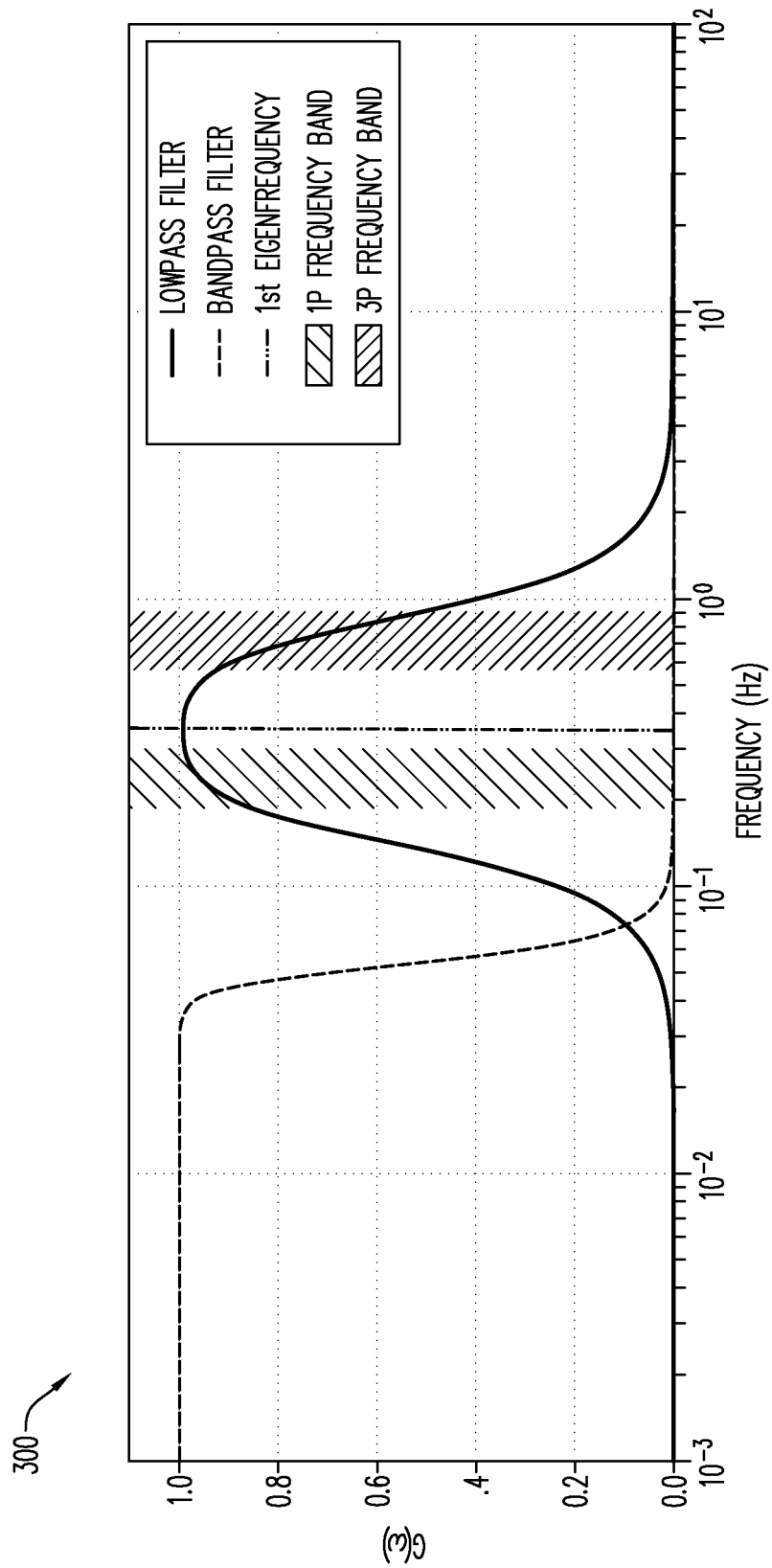
FIG. 3 is a diagram illustrating frequency response functions of a lowpass filter and a bandpass filter, in accordance with an example embodiment.

FIG. 3 illustrates an example of frequency response functions of both a lowpass filter and a bandpass filter, in accordance with an example embodiment. In this example, the lowpass filer and bandpass filter have characteristics used for extraction of desired motions of a wind turbine. Referring to graph 300 of FIG. 3, it is apparent that the natural frequencies of the wind turbine (i.e., 1P and 3P frequencies) from the rotor on top of the beam/tower are in vicinity if the 1st eigenfrequency, which makes filtering of exclusively 1st eigenmode motion difficult. In the graph 300, frequency response functions of both the lowpass filter (blue curve) and the bandpass filter (red curve) are used for extracting quasi static (0th mode) and 1st eigenmode motion, respectively. Dashed vertical line represents frequency of the 1st eigenmode, green and magenta bands represent possible positions of 1P and 3P frequencies.

For mode summation and rotation superposition, for example, the lowpass filtered rotations, i.e., Euler angles $R_x^0, R_y^0$ corresponding to quasi static motion (0th mode) and bandpass filtered filtered rotations, i.e., Euler angles $R_x^1, R_y^1$ corresponding to 1st eigenmode motion may be superposed as:

$$\begin{pmatrix} R_x \\ R_y \end{pmatrix}_{CS} = \begin{pmatrix} R_x^0 \\ R_y^0 \end{pmatrix}_{CS} + \kappa \begin{pmatrix} R_x^1 \\ R_y^1 \end{pmatrix}_{CS} \quad \text{Equation 6}$$

where angles $R_x$, $R_y$ represent the motion of the free end of the beam to a certain (desired) degree of precision.

In this example, is a compensation factor. The angles $R_x^1$, $R_y^1$ which are bandpass filtered in order to reflect the 1st eigenmode motion only are calculated from accelerations measured by the accelerometer. Those accelerations inevitably contain beside the $\vec{g}$ vector also linear accelerations due to the dynamic nature of the 1st eigenmode motion. In order to calculate correct angles of the beam end in motion, only the $\vec{g}$ contribution in the accelerations needs to be extracted, i.e., the contribution from linear accelerations may be removed. For a general motion this can be cumbersome without use of an additional sensor such as a gyroscope and a proper setup of some sensor fusion filter such as a Kalman filter. Alternatively, insight into the nature of the motion, for example, periodicity, known eigenfrequency, and upper bounds of amplitude, allows for correction of the raw signal without use of an additional sensor. Note that in this example no such factor is needed for calculating the angles for quasi-static motion, since contribution from linear accelerations is negligible.

Figure 4:
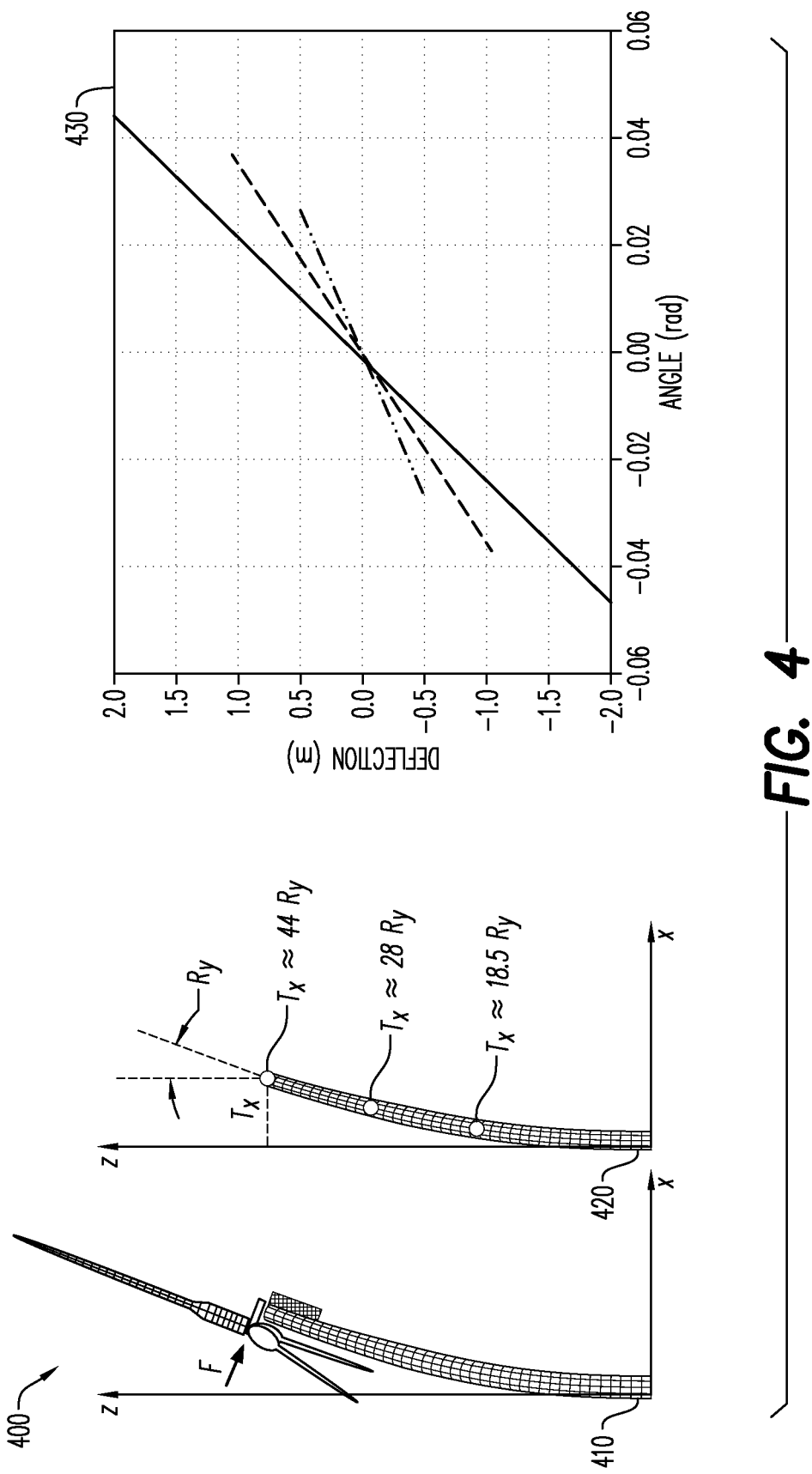
FIGS. 4 and 5 are diagrams illustrating relationships between deflections and angles for different positions on a real asset, in accordance with example embodiments.
Figure 5:
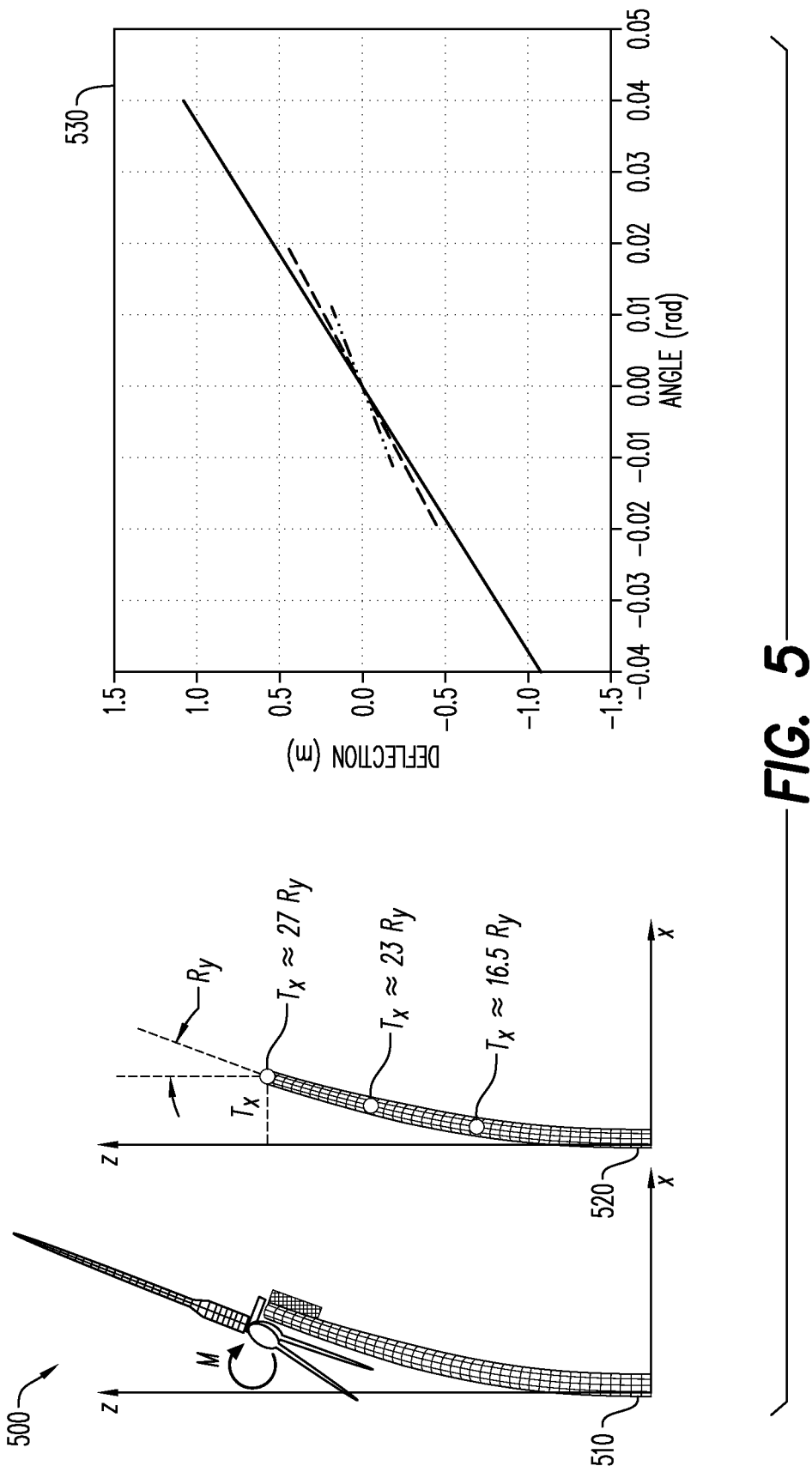

For angle-to-deflection transformation, calculation of beam end deflection from beam end inclination may rely on a known relationship between angles and deflections for a given structure geometry and load type which in the examples here is a wind turbine having a steel structure. By prescribing a concentrated force or a moment on the free end of a beam of the wind turbine in a FE model, the functional relation between deflection and angle at the beam end can be determined. FIGS. 4 and 5 show relationships 400 and 500 between deflections and angles for three positions/heights $(T_x)$ on a wind turbine tower for static ($0^{th}$ mode) motion with concentrated force and moment, respectively. For dynamic 1st eigenmode motion, this example assumes that the relation between deflections and angles is identical to those for static motion.

In the example of FIG. 4, deflection versus angle ratios 420 for three vertical positions of a concentrated force acting on a tower top 410 are identified and plotted as a graph 430. In this example, deflection versus angle ($R_y$) is plotted on the graph 430. In the example of FIG. 5, deflection versus angle ratios 520 for three vertical positions of a moment acting on a tower top 510 are identified and plotted as graph 530. In these examples, deflections may be extracted at the free end of the beam and may be expressed by Equation 7.

$$\begin{pmatrix} T_x \\ T_y \end{pmatrix} = B^0 \begin{pmatrix} R_y^0 \\ -R_x^0 \end{pmatrix} + KB^1 \begin{pmatrix} R_y^1 \\ -R_x^1 \end{pmatrix} = \quad \text{Equation 7}$$

$$= \begin{pmatrix} b_{11}^0 & 0 \\ 0 & b_{22}^0 \end{pmatrix} \begin{pmatrix} R_y^0 \\ -R_x^0 \end{pmatrix} + K \begin{pmatrix} b_{11}^1 & 0 \\ 0 & b_{22}^1 \end{pmatrix} \begin{pmatrix} R_y^1 \\ -R_x^1 \end{pmatrix},$$

In Equation 7, and representing angles of quasi static (0th mode) and 1st eigenmode, respectively, K is the dynamic factor and is discussed in more detail below, while $B^0$ and $B^1$ are diagonal matrices containing info on the relationship between angles and deflections at the free end of the beam for 0th mode and 1st eigenmode, respectively. In this case, coefficients may be determined using an FE-model and a prescribed external load, a force or a moment.

The application described herein may also perform analytical estimation of linear acceleration compensation (dynamic factor). When using an accelerometer to measure inclination, one method is to measure the direction of the gravitational pull on the accelerometer. This is used in simpler inclinometer designs as an accelerometer typically has a good quality to cost ratio. In an accelerated system, measuring the direction of the gravitational pull is not straightforward because it is difficult if not impossible to separate it directly from the total acceleration. However, with some a priori information about the system, the linear acceleration may in certain systems be compensated for.

An inverted rigid pendulum of length L or equivalently a standing flexible structure may be identified such that the end displacement d of the structure end is approximately related to the structure end angle θ, by Equation 8.

$$x(t) = L\theta(t) \quad \text{Equation 8}$$

Further, a harmonic oscillation is assumed such that the end of the pendulum has an orientation given by $$\theta(t) = \theta_0 \sin(\omega t) \quad \text{Equation 9}$$

and a corresponding displacement given by $$x(t) = x_0 \sin(\omega t) \quad \text{Equation 10}$$

Where the frequency ω, maximal angle $\theta_0$ and displacement $x_0$ are defined and $\theta_0$ is related by $x_0 = L\theta_0$.

An accelerometer located at the end of the structure may measure an acceleration in the local frame of reference given by two contributions $$a_x(t) = -g \sin(\theta(t)) + L\ddot{\theta}(t) \quad \text{Equation 11}$$

assuming $\theta_0 \ll 1$, and using $\ddot{\theta}(t)=-\omega^2\theta(t)$ it can be determined that $$a_w(t)=-(g+\omega^2L)\theta(t) \quad \text{Equation 12}$$

The true acceleration is given by $$\ddot{x}(t)=-\omega^2 x(t)=-\omega^2 L\theta(t) \quad \text{Equation 13}$$

And hence $$\ddot{x}(t) = \frac{1}{(1+g)/(\omega^2 L)} a_x(t) \quad \text{Equation 14}$$

In this example, the orientation $\theta(t)$ may be calculated from an accelerometer by $$\theta(t) = a\tan\frac{a_x(t) - \ddot{x}(t)}{a_L(t)} \approx a\tan\left(\frac{1}{1+\frac{\omega^2}{\omega_0^2}}\frac{a_x(t)}{a_z(t)}\right) \quad \text{Equation 15}$$

Where $\omega_0 = \sqrt{g/L}$.

An example compensation factor for a $1^{st}$ mode may be generated. For example, by using $g=9.82$ m/s$^2$ and $L=44$ m and $\omega_0/8\pi=0.075$ Hz a linear acceleration compensation factor at $\kappa=22.68$ is determined which is used as the following:

$$(t) = a\tan\left(\frac{1}{22.68}\frac{a_x(t)}{a_z(t)}\right) \quad \text{Equation 16}$$

Figure 6:
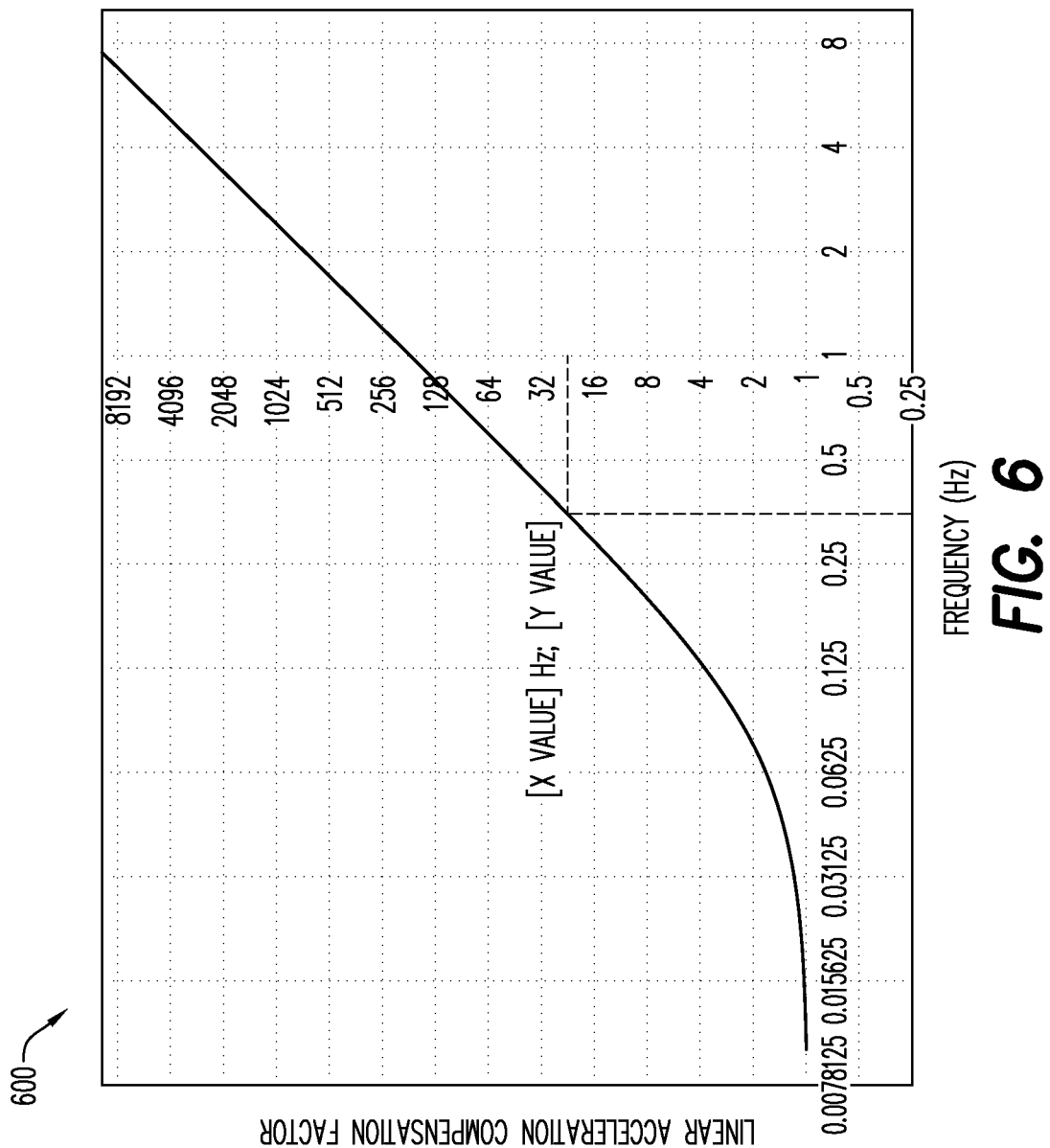
FIG. 6 is a diagram illustrating an example of a linear compensation factor in accordance with an example embodiment.

An example of the linear compensation factor is shown in FIG. 6. For example, a linear acceleration compensation factor 600 for a wind turbine tower with effective length (L=44 m) is shown as a graph over frequency. At 1st structural mode (0.35 Hz) the compensation factor is 22.67. Note that for higher frequencies a different structural mode could be triggered with a lower effective length L giving potentially a lower (or negative) compensation factor.

According to various embodiments, the application reduces the number of sensors that are needed to measure physical locations on the real asset. In the previous examples, virtual forces that are created based on the real asset can be applied to the virtual asset enabling virtual sensors to be added on the virtual model at different places than at which physical sensors are located on the real asset. Also, the virtual sensors can be placed at locations where the real sensors cannot be placed (e.g., inside of a beam, etc.). Furthermore, there is no need for maintenance, calibration, expense of paying for physical hardware, etc. with virtual sensors as they do not have a cost associated therewith. As a result, the virtual sensors reduce cost and resources. In the example of the wind turbine, one has access to the very top of the wind turbine in the real world allowing real sensors to be placed there. However, the remainder of the wind turbine is difficult to access, especially while in operation. According to various aspects, virtual sensors can be used in any location on the virtual asset that are difficult to access with real sensors on the real, physical asset.

Another aspect of the application described herein is the ability to determine damage or fatigue has occurred to the real asset based on monitoring stress and other virtual forces that are being applied to the virtual asset. When monitoring a real asset in real-time there is a lot of data to sift through. Sensed data from the physical asset often includes damage or fatigue values or other indicators. These indicators can indicate if a structure is becoming damaged or fatigued such as cracks, etc. The related way of performing damage assessment is not continuous and not performed in real-time. Rather, typically a Rainflow counting is performed after all data over many stress cycles have been obtained. Only by looking over the entire data can individual stress cycles be obtained. As will be appreciated, this method is slow and only capable of being performed after the fact.

The example embodiments include a rainflow counting algorithm that can be performed in real-time without any loss of quality by performing the algorithm in incremental fashion using a sliding time window. Stress cycles don't have a regular start and stop which has most likely prevented such a method from being previously produced. However, the rainflow counting algorithm performed herein can detect when a stress cycle starts and stops in real-time. That is, the algorithm does not require the entire amount of time series data in order to identify stress cycles but can identify the stress cycles almost instantaneously. As a result, there is less data involved with computation and thus faster damage determinations. Within each stress cycle the algorithm can also identify an amount of damage or fatigue that is occurring to the virtual structure. When an alert damage level is reached, a warning may be output which may trigger a physical inspection or a replacement or some sort of corrective action.

In some embodiments, hot spots, which are points on a virtual structure where virtual sensors (e.g., strain gauges) can be placed based on previous knowledge where damage will likely occur on the physical structure. One of the advantages provided by this method is that new virtual sensors can be positioned at other places on the virtual structure where physical sensors are not present or not capable of being placed on the real structure. With the wind turbine example, the idea is to run the wind turbine in strong winds but the strong winds create the most stress on the turbine and also the most stress cycles. The application can be used as an operational tuning to fine tune the balance between damage assessment and energy acquired to find a cost efficient balance between the two such that the wind turbine is not running in conditions that are cost negative from a damage to the wind turbine perspective.

To be able to perform damage calculations using rainflow counting in real-time, an incremental rainflow counting and fatigue damage assessment is performed by the software described herein. The method has minimal memory requirements and enhanced accuracy by avoiding data segmentation and histogram sorting. Data points of stress values at predefined hotspots may be provided in real-time from the sensor-driven digital twin virtual model. Each data point may be first evaluated sequentially by an extreme value filter. The new extreme value may give rise to new cycles which are found non-iteratively using the rainflow counting residual from the previous time step. The new identified cycles may be further used directly in the fatigue damage calculation using a SN-curve model without histogram-sorting. Accordingly, the input signal (e.g., stress or strain) may be processed on-the-fly by performing the damage calculation every time a new set of data points is available. According to various embodiments, the SN-curve (also referred to as S-N Curve) is a plot of the magnitude of an alternating stress versus the number of cycles to failure for a given material. Typically both the stress and number of cycles are displayed on logarithmic scales.

An example of pseudo-code for the rainflow counting algorithm is provided below in Table 1. In this example, the software rigorously searches for closed hysteresis cycles identified as a stress range between extrema enclosed by larger stress ranges on either side. When provided with a series of extrema (alternating minima and maxima) the basic principle is to find all new cycles as soon as possible. The rainflow counting algorithm may include a two-step process. In a first step, all cycles from time series data with a remainder extrema series (residual) are extracted. The second step is to place a duplicate of the residual consequently to the original and extract all possible cycles again.

TABLE 1

Damage calculation in the entire function
New identified cycles = RainFlowMethod(residual, new extreme value)
- Define initial condition
- Define hot spot
- Define initial counted damage
    while (data is available)
        - Calculate new value at hot spot for the new time step
        - new extreme = FindExtreme(new value)
        - If (new extreme is found)
            o New identified cycles = RainFlowMethod(residual,new extreme values)
            o Counted damage= Counted damage + sum(SNCurve(New identified cycles)
            o Residual cycles = RainFlowMethod(residual, residual)
            o Residual damage= sum(SNCurve(New identified cycle)
            o Accumulated damage = Counted damage + Residual damage
Procedure for extrema identifier
Pseudo-code for finding new cycles. The remainder of extreme values from previously cycle identification are named residual and are used as basis for the cycle identification.
new extreme = FindExtreme(new value)
if (searching for maximum)
    if (new value ≥ candidate)
        set candidate as new value
        search for maximum next function call
    if ( (candidate − new value) > cut off)
        set new extreme as candidate
        set candidate as new value
        search for minimum next function call
if (searching for minimum)
    if (new value ≤ candidate)
        set candidate as new value
        search for minimum next function call
    if ( (new value − candidate) > cut off)
        set new extreme as candidate
        set candidate as new value
        search for maximum next function call
Procedure for SN-Curve
Pseudo-code for finding new cycles. The remainder of extreme values from previously cycle identification are named residual and are used as basis for the cycle identification.
DeltaDamage = SN-Curve(Cycles)
    Define ULSCycleMagnitude;
    Define m (=3)
    DeltaDamage = (CycleMagnitude / ULSCycleMagnitude)$^m$
Core procedure for Rainflow algorithm.
Pseudo-code for finding new cycles. The remainder of extreme values from previously cycle identification are named residual and are used as basis for the cycle identification.
New identified cycles = RainFlowMethod(residual,new extreme values)
For each new extreme value
    Add the extreme value to end of residual
    while (first iteration OR identified cycles last iteration)
        if (elements in residual > 3)
    - define pre range by 3rd and 4th last extreme in residual.
    - define checked range by 2st and 3rd last extreme in residual.
    - define new range by 1st and 2nd last extreme in residual.
        if (checked_ range is less than both pre_range and new range)
        - Remove extremes in checked range from residual and add checked range to New identified cycles.

Figure 7:
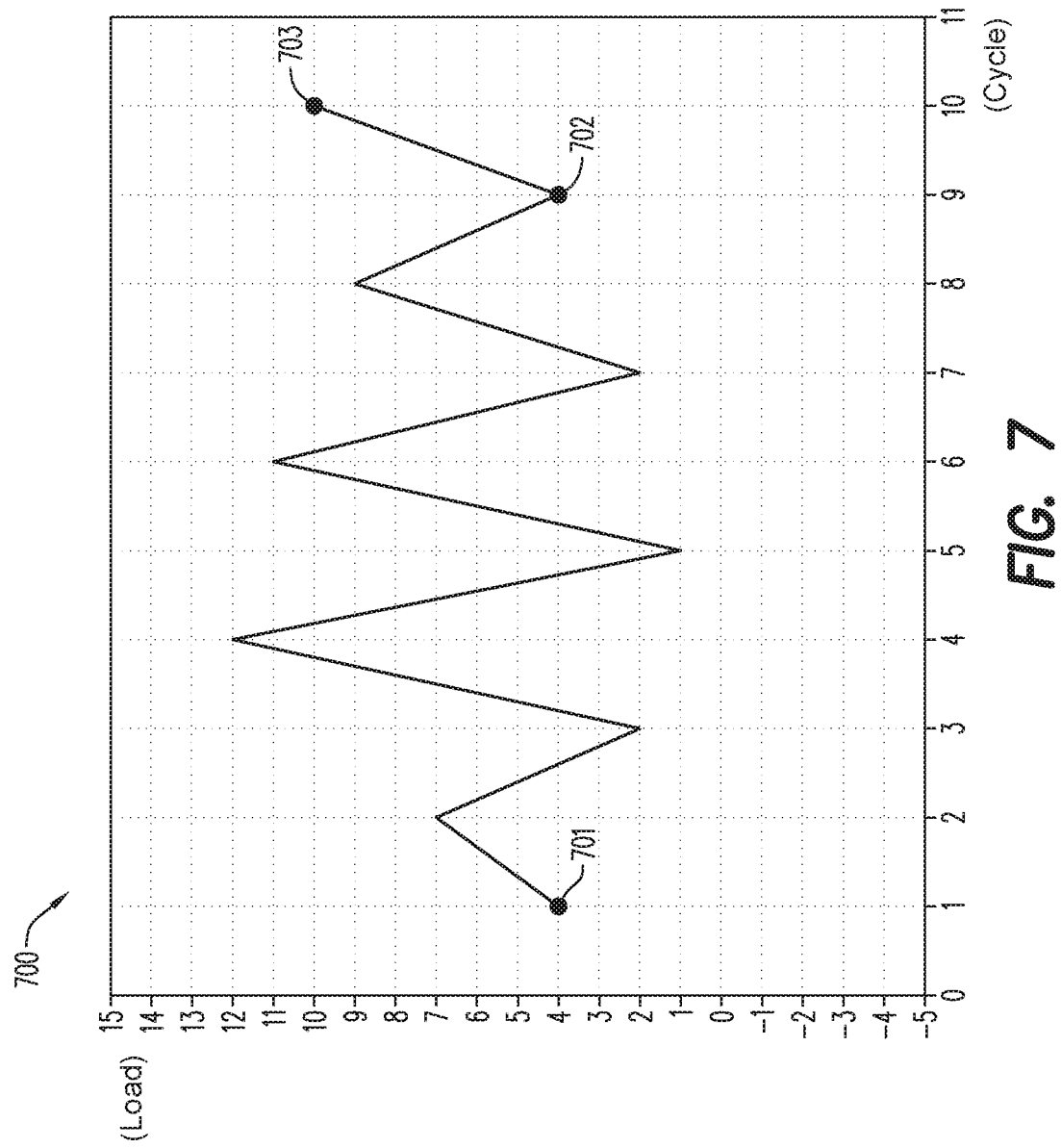
FIG. 7-9 are diagrams illustrating rainflow graphs in accordance with example embodiments.
Figure 8:
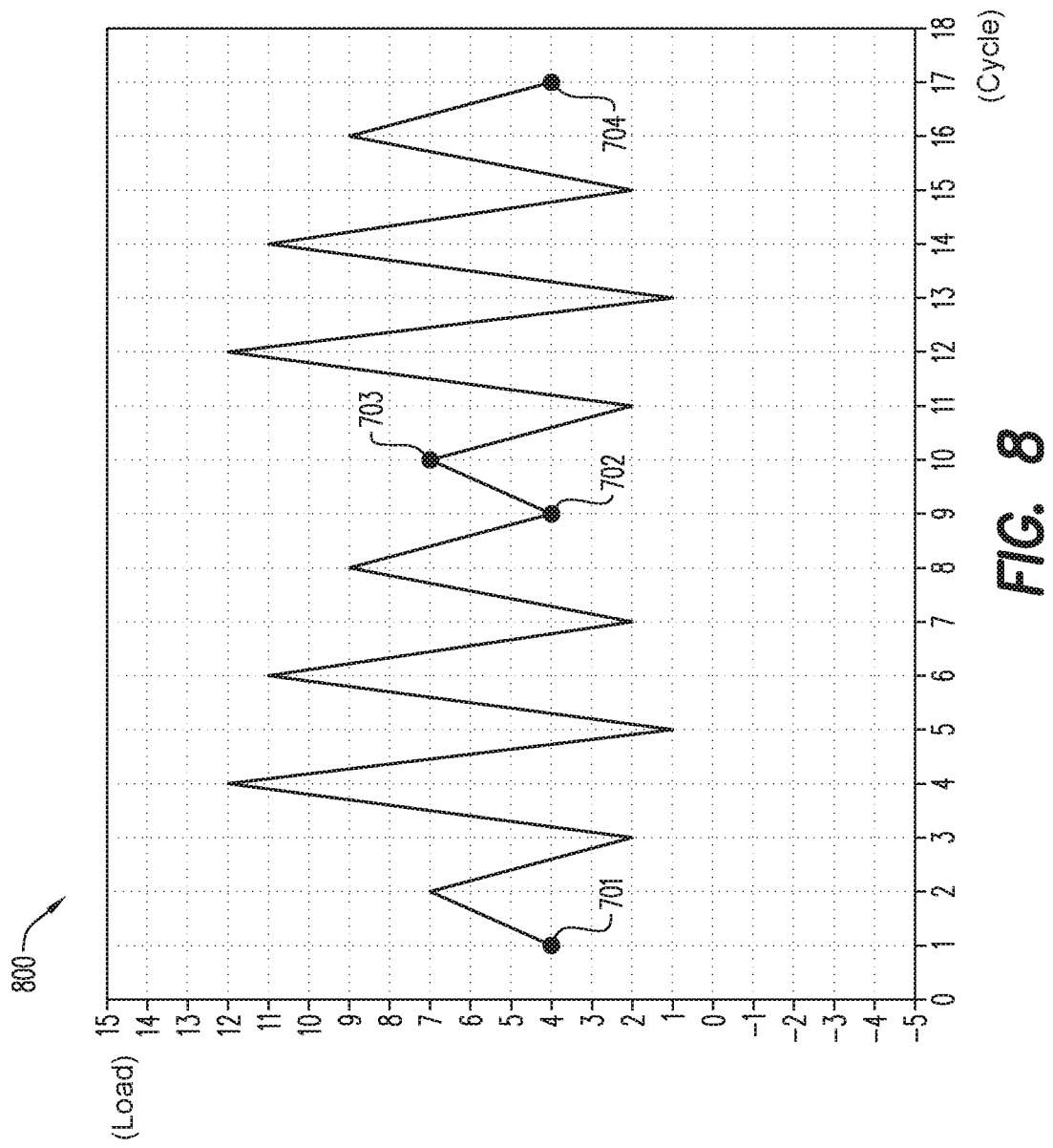
Figure 9:
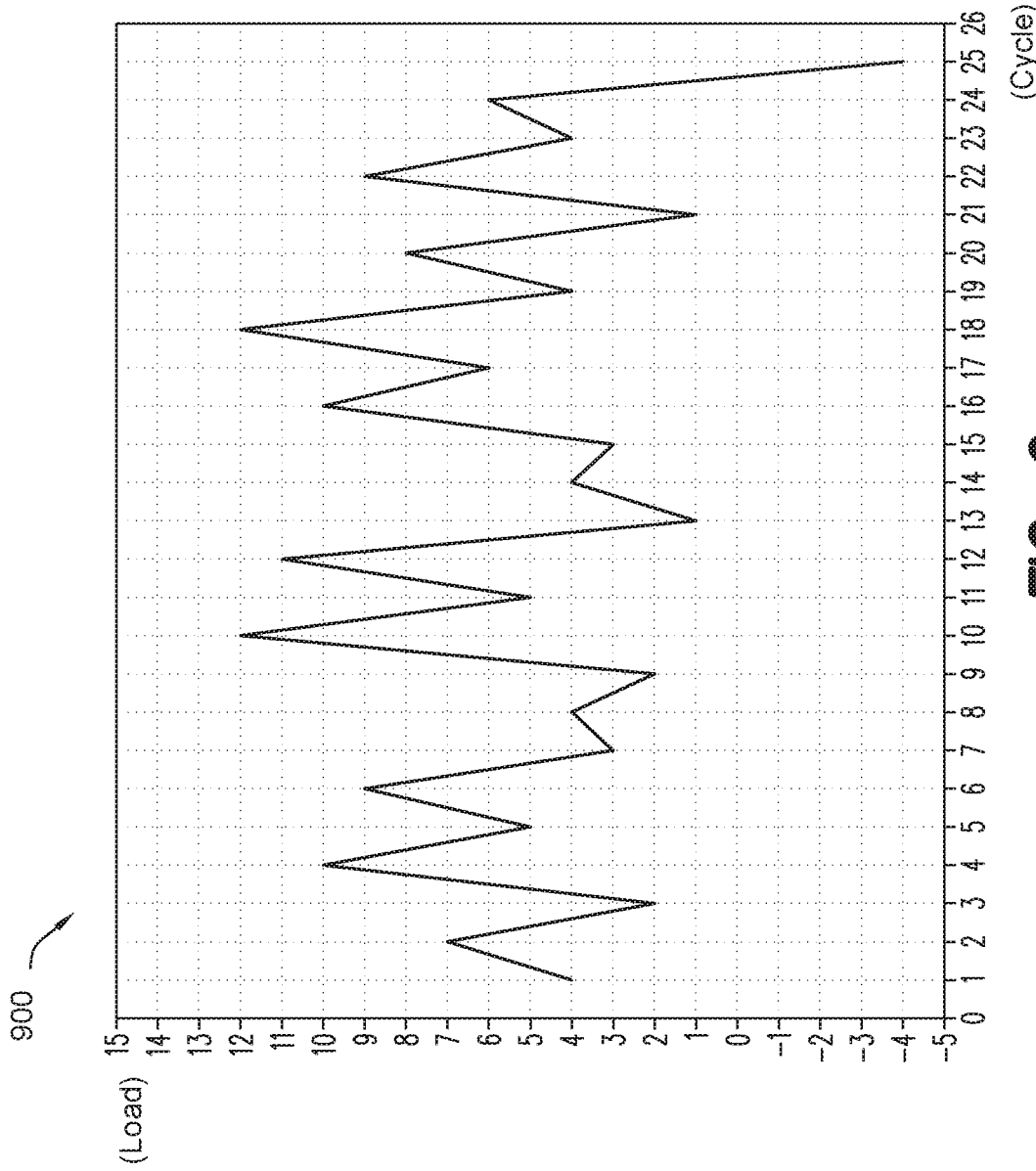

An example of a structure of the rainflow residual including new extrema is shown in graph 700 FIG. 7. The first part of the rainflow residual is shown from data point 701 to data point 702. New extrema is shown from data point 702 to 703. FIG. 8 includes a graph 800 showing an additional new extrema from data point 703 to 704 which can be generated based on the extraction method for residual cycles. Furthermore, FIG. 9 includes a graph 900 that shows a reference signal that may be used for comparison with the performance of the graphs 700 and 800 of FIGS. 7 and 8. In this example, the correct cycles to be counted are 5-6, 7-8, 4-9, 11-12, 14-15, 16-17, 19-20, 13-18, 23-24, 2-3, 21-22, and 10-25.

For the SN-curve model, the maximum number of stress cycles N of a given magnitude S is defined by $$\log N = -m \log\left(\frac{S_i}{S_0}\right) \quad \text{Equation 17}$$

where $S_0$ correspond to an ultimate limit state (ULS) condition with failure at only one cycle, and m is the slope in the log-plot. Assuming every cycle $S_i$ gives independently an incremental damage $\Delta D_i$ the expression can be rewritten as $$\Delta D_i = \left(\frac{S_i}{S_0}\right)^m \quad \text{Equation 18}$$

with an accumulated damage of $$D = \sum_i \left(\frac{S_i}{S_0}\right)^m \quad \text{Equation 19}$$

where failure is achieved at D=1. In this example, the implemented model uses the parameters m=3.

Figure 10:
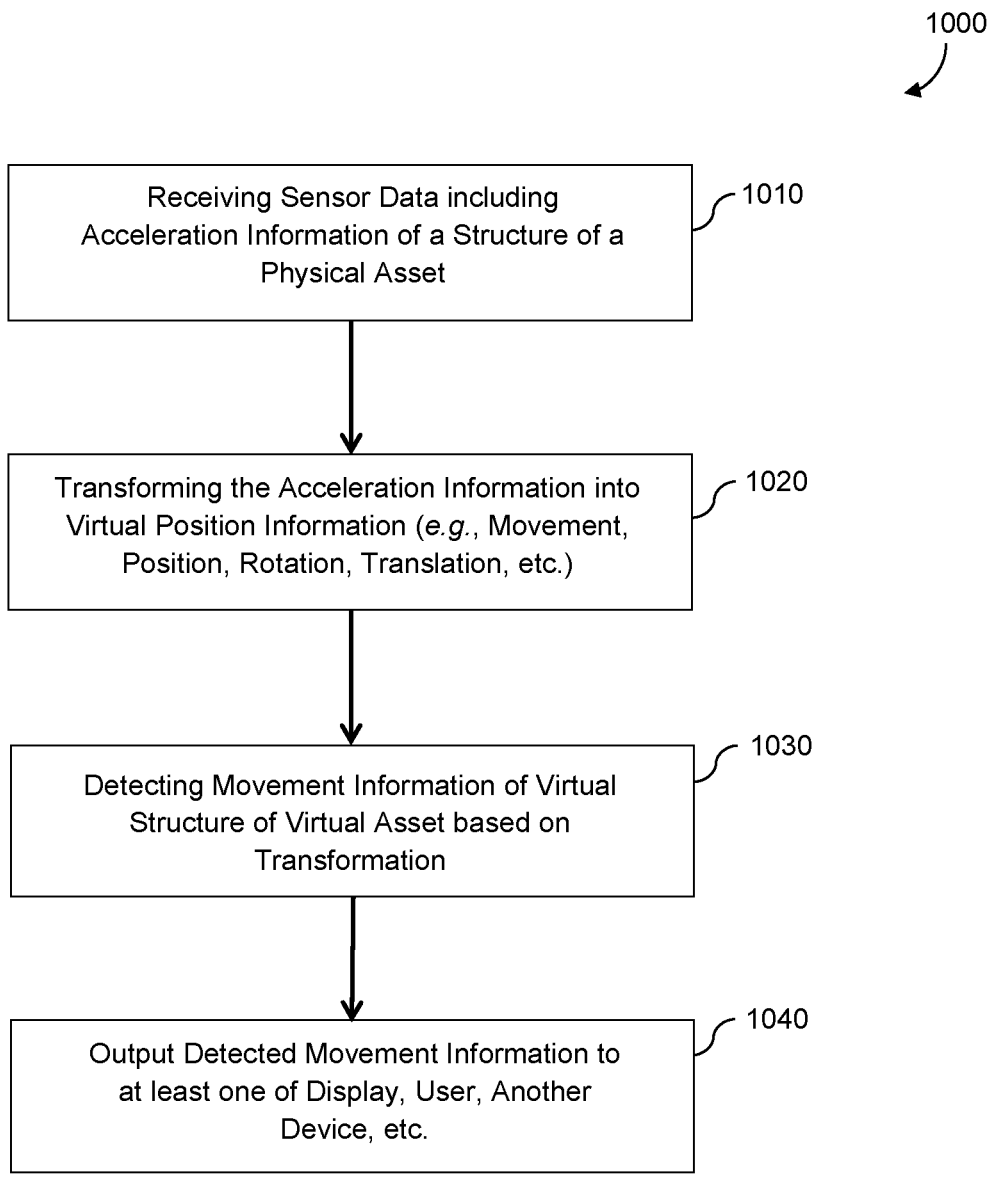
FIG. 10 is a diagram illustrating a method for generating a applying movement information to a virtual asset in accordance with an example embodiment.

FIG. 10 illustrates a method 1000 for generating and applying movement information to a virtual asset in accordance with an example embodiment. For example, the method 1000 may be performed by a device executing software described herein. Referring to FIG. 10, in 1010, the method includes receiving sensor data of a physical asset. Here, the sensor data may include acceleration information associated with a location on a physical structure of the physical asset. The acceleration information may be obtained based on accelerometers attached to the physical asset at one or more locations. As a non-limiting example, the physical asset may include at least one of a wind turbine, a crane, a winch, an oil platform, a bridge, a building, and the like. In some embodiments, gravity included within the acceleration information may be compensated for based on a linear compensation factor of the physical asset to generate compensated acceleration information.

In 1020, the method includes transforming the acceleration information into virtual position information and applying the virtual position information to a virtual asset corresponding to the physical asset. The virtual asset may be a digital replica of the physical asset and may be generated by simulation software based on a known structure of the physical asset. The transforming may include generating rotation information of the structure of the physical asset with respect to a fixed axis or plurality of axes, and applying the generated rotation information to the virtual asset to generate a change in position of the virtual structure of the virtual asset within the virtual simulation space.

In some embodiments, the transforming may include determining Euler angles (X, Y, and Z) of the structure of the physical asset with respect to three fixed coordinate axes, and further transforming the Euler angles into deflections and applying the deflections to the virtual structure of the virtual asset. In some embodiments, the transforming may include filtering the Euler angle information with a lowpass filter (e.g., Butterworth filter) and transforming the filtered Euler angles into the deflections. In some embodiments, the transforming of the Euler angles into deflections may be performed based on predefined geometric relationships between angles and deflections of the structure of the physical asset.

In 1030, the method includes detecting movement information of a virtual structure of the virtual asset based on the transformed and applied virtual position information. For example, the detecting of the movement of the virtual structure of the virtual asset may be performed by virtual sensors that are positioned on the virtual asset. The virtual sensors may detect a change in position (e.g., X axis, Y axis, and Z axis) of structural components of the virtual asset. As described herein, virtual sensors can be placed at locations on the virtual asset which are difficult to place physical sensors on the physical asset, such as inside of a beam, and the like. In 1040, the method further includes outputting information concerning the detected movement information for display to a display device. For example, the information may output an image showing how the structure is moving as well as alerts when the movement exceeds a predetermined threshold.

Figure 11:
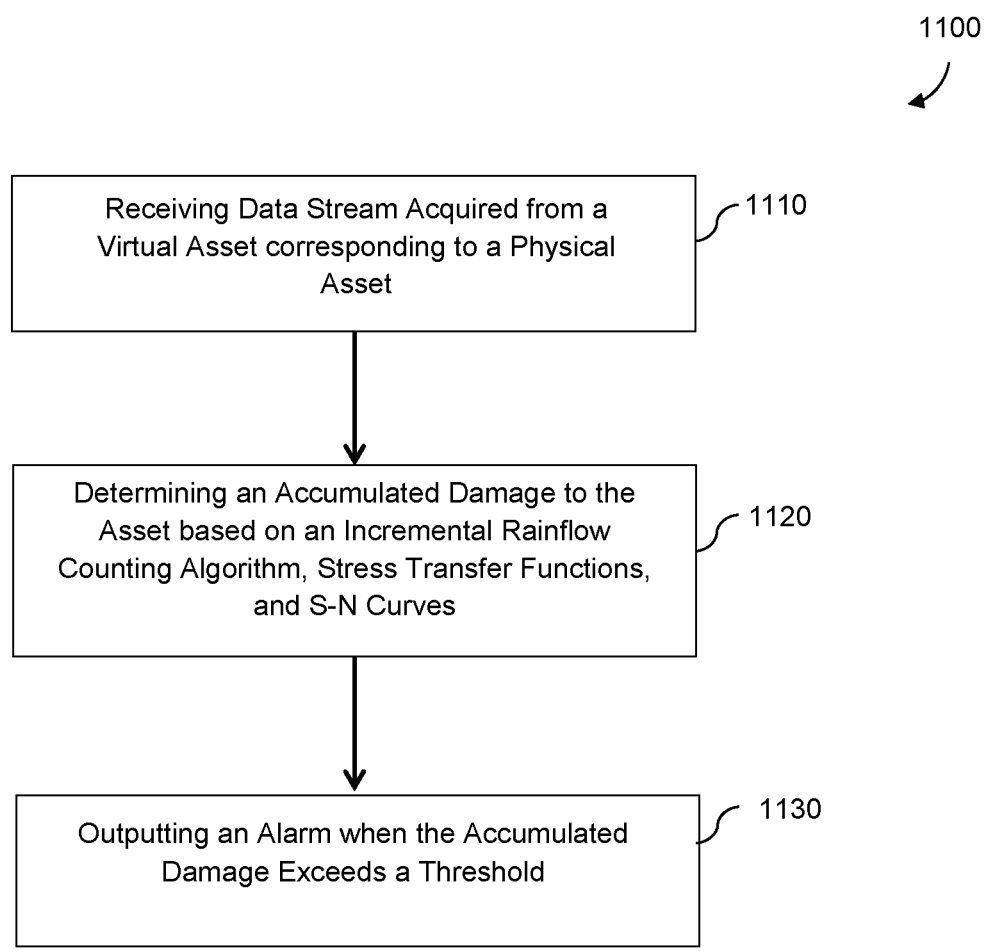
FIG. 11 is a diagram illustrating a method for determining damage information of aN asset in accordance with an example embodiment.

FIG. 11 illustrates a method 1100 for determining damage information of an asset in accordance with an example embodiment. For example, the method 1100 may be performed by a device executing software described herein. Referring to FIG. 11, in 1110, the method includes receiving data obtained from a structure of an asset. Here, the asset may be a physical asset being monitored in real-time such as a wind turbine, a crane, a winch, an oil platform, a bridge, a building, and the like. As another example, the asset may be a virtual asset that is a digital replica of the physical asset. In this example, the data may be provided from virtual sensors attached at virtual locations of a virtual structure of the virtual asset. The receiving in 1110 may include detecting time-series information (e.g., position, movement, rotation, stress, translation, etc.) over time from one or more sensors (e.g., physical or virtual) that are located at predefined hot spots on the structure of the asset.

In 1120, the method further includes determining an accumulated damage amount to the asset based on data within the data stream and one or more algorithms provided herein including a rainflow counting algorithm, stress transfers capable of determining stress to a structure of an asset, and SN curves. According to various embodiments, the determining in 1120 may be performed using an incremental rainflow counting algorithm on the received damage information. The incremental rainflow counting algorithm may include a sliding time window rather than use all damage information over time. For example, the incremental rainflow counting algorithm may determine the accumulated damage of the virtual asset based on stress cycles. Here, the incremental rainflow counting algorithm may determine the accumulated damage for a current stress cycle based on residual virtual damage information of the virtual asset from a previous stress cycle until an extrema is reached. Also, the method may include identifying the stress cycles based on extremas in the received virtual damage information. In some embodiments, the sliding time window may include one stress cycle, and the iterative rainflow counting algorithm may be performed at least once per stress cycle. In 1130, the method includes, in response to the accumulated damage exceeding a threshold level, transmitting information concerning the accumulated damage for display on a display device. For example, the transmitting may include transmitting an alert to a technician or engineer monitoring the real asset.

Figure 12:
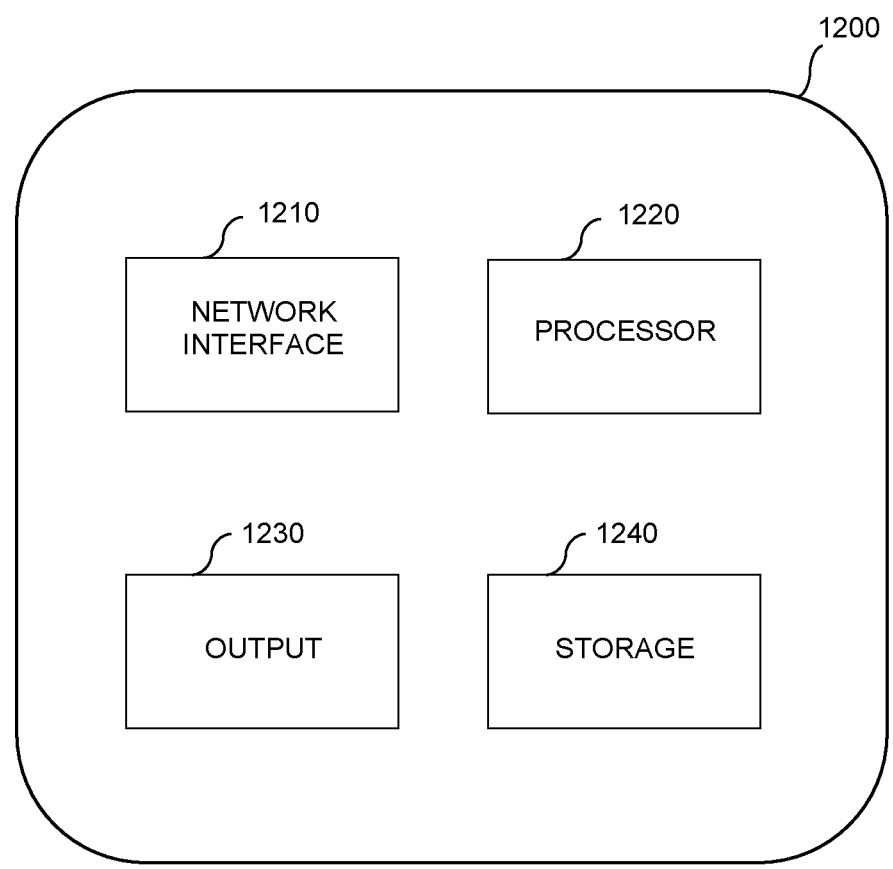
FIG. 12 is a diagram illustrating a computing device according to an example embodiment.

FIG. 12 illustrates a computing device 1200 for monitoring a real asset based on a simulation of a corresponding virtual asset, according to an example embodiment. For example, the device 1200 may be a cloud computing system, a server, a user device, and the like. Also, the device 1200 may perform the methods of FIG. 10 and FIG. 11. Referring to FIG. 12, the device 1200 includes a network interface 1210, a processor 1220, an output 1230, and a storage device 1240. Although not shown in FIG. 12, the device 1200 may include other components such as a display, an input unit, a receiver/transmitter, and the like. The network interface 1210 may transmit and receive data over a network such as the Internet, a private network, a public network, and the like. The network interface 1210 may be a wireless interface, a wired interface, or a combination thereof. The processor 1220 may include one or more processing devices each including one or more processing cores. In some examples, the processor 1220 is a multicore processor or a plurality of multicore processors. Also, the processor 1220 may be fixed or it may be reconfigurable. The output 1230 may output data to an embedded display of the device 1200, an externally connected display, a cloud, another device, and the like. The storage device 1240 is not limited to any particular storage device and may include any known memory device such as RAM, ROM, hard disk, and the like.

According to various embodiments, the network interface 1210 may receive sensor data of a physical asset that includes acceleration information associated with a structure of the physical asset. For example, the sensor data may include accelerometer data obtained from at least one of a wind turbine, a crane, a winch, an oil platform, a bridge, a building, or other structure. The processor 1220 may generate a virtual asset that corresponds to the physical asset. The virtual asset may a digital replica of the physical asset and have the same shape, size, materials, components, and the like, as the physical asset except that the virtual asset is a digital replication in digital space.

The processor 1220 may transform the acceleration information into virtual position information associated with the virtual asset that corresponds to the physical asset. Accordingly, the processor 1220 may apply the virtual position information to the virtual asset causing the virtual asset to move. In response, the processor 1220 may detect movement information of a virtual structure of the virtual asset based on the transformed and applied virtual position information. Also, the processor 1220 may control the output 1230 to output information concerning the detected movement information for display to a display device. For example, the storage 1240 may store rules and procedures to be performed by the processor 1220 based on readings acquired from the virtual sensors.

For example, the processor 1220 may generate rotation information of the structure of the physical asset with respect to a fixed axis, and apply the generated rotation information to the virtual asset to generate a change in position of the virtual structure of the virtual asset. Here, the processor 1220 may determine Euler angles of the structure of the physical asset with respect to a fixed axis, transform the Euler angles into deflections, and apply the deflections to the virtual structure of the virtual asset. In some embodiments, the processor 1220 may filter the Euler angles with a lowpass filter and transform the filtered Euler angles into the deflections. The processor 1220 may transform the Euler angles into deflections based on predefined geometric relationships between angles and deflections of the structure of the physical asset.

In some embodiments, the processor 1220 may perform compensation on the acceleration information based on a linear compensation factor of the physical asset to generate compensated acceleration information. The compensated acceleration information may be compensated for to remove gravity. In some embodiments, the processor 1220 may detect movement of the virtual structure of the virtual asset from virtual sensors that are positioned on the virtual asset. In this case, a least one virtual sensor may be positioned at a place on the virtual asset that is not accessible on the physical asset, such as inside a virtual beam of the virtual structure of the virtual asset that corresponds to a steel beam on the physical structure.

According to other various embodiments, the processor 1220 may receive damage information acquired from a structure of the virtual asset while the physical asset is being monitored, and determine an accumulated damage amount to the virtual asset based on the received damage information over one or more cycles. Here, the determining may include performing an incremental rainflow counting algorithm on the received damage information using a sliding time window. The output 1230 may output information concerning the accumulated damage for display on a display device, in response to the accumulated damage exceeding a threshold level. Here, the threshold level may be stored in the storage 1240 and used for comparison each time the data is updated on the virtual asset.

For example, the processor 1220 may detect virtual time-series damage information from one or more virtual sensors positioned on predefined hot spots on the virtual structure of the virtual asset. The time-series information may include movement information such as rotation, translation, deflection, and the like. The incremental rainflow counting algorithm processed by the processor 1220 may determine the accumulated damage of the virtual asset based on stress cycles identified from within the received damage information. For example, the accumulated damage of the virtual asset for a current stress cycle may be determined based on residual virtual damage information of the virtual asset from a previous stress cycle. Furthermore, the processor 1220 may identify the stress cycles based on extremas in the received virtual damage information. In some embodiments, the sliding time window may include one stress cycle, and the iterative rainflow counting algorithm may be performed at least once per stress cycle.

As will be appreciated based on the foregoing specification, the above-described examples of the disclosure may be implemented using computer programming or engineering techniques including computer software, firmware, hardware or any combination or subset thereof. For example, the methods described herein may be implemented via one or more software applications (e.g., program, application, code, module, service, etc.) executing on one or more computing devices. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system for determining real-time damage of an asset, the computing system comprising:
   a processor configured to
      receive a data stream acquired from a structure of the asset that is monitored, and
      iteratively determine an accumulated damage amount to the asset using a sliding time window in which damage is incrementally calculated in time one stress cycle at a time within the received data stream,
      wherein, for each iteration, the processor is configured to identify a start and a stop point of a new stress cycle in time corresponding to a respective minima and maxima of a new extrema in the received data stream, determine a current increment of damage to the asset within the new stress cycle that occurs between the minima and maxima of the new extrema, and determine an accumulated damage for the iteration based on the determined current increment of damage for the new stress cycle added to residual damage of the asset which is previously determined during one or more previous iterations corresponding to one or more previously received stress cycles; and
   an output configured to output information concerning the accumulated damage for display on a display device.

2. The computing system of claim 1, wherein the asset comprises a physical asset including at least one of a wind turbine, a crane, a winch, an oil platform, and a bridge.

3. The computing system of claim 1, wherein the asset comprises a virtual asset which comprises a virtual representation of a physical structure of a physical asset and its movement over time, and the data stream is acquired from virtual sensors attached to a corresponding virtual structure of the virtual asset in virtual space.

4. The computing system of claim 1, wherein the processor is configured to detect time-series damage information from one or more sensors positioned on predefined hot spots on the structure of the asset.

5. The computing system of claim 1, wherein the processor is configured to determine the accumulated damage of the asset for the new stress cycle based on residual damage information of the asset that has already been determined from a previous extrema in the received data corresponding to a previously received stress cycle.

6. The computing system of claim 1, wherein the output is configured to at least one of continuously output the information concerning the accumulated damage and output the information concerning the accumulated damage in response to a measure of the accumulated damage exceeding a threshold level.

7. The computing system of claim 1, wherein the processor is configured to break-up a sequence of time series data into a plurality of extremas corresponding to a plurality of stress cycles, respectively, and a damage calculation is performed at least once per extrema prior to determining damage to the asset during a next extrema.

8. A method for determining real-time damage of an asset, the method comprising:
   receiving a data stream acquired from a structure of the asset that is monitored;
   iteratively determining an accumulated damage amount to the asset using a sliding time window in which damage is incrementally calculated in time one stress cycle at a time within the received data stream, wherein for each iteration, the determining comprises
      identifying a start and stop point of a new stress cycle in time corresponding to a respective minima and maxima of a new extrema in the received data stream,
      determining a current increment of damage to the asset within the new stress cycle that occurs between the minima and maxima of the new extrema, and
      determining an accumulated damage for the iteration based on the determined current increment of damage for the new stress cycle added to residual damage of the asset which is previously determined during one or more previous iterations corresponding to one or more previously received stress cycles; and
   outputting information concerning the accumulated damage amount of the asset for display on a display device.

9. The method of claim 8, wherein the asset comprises a physical asset including at least one of a wind turbine, a crane, a winch, an oil platform, and a bridge.

10. The method of claim 8, wherein the asset comprises a virtual asset which comprises a virtual representation of a physical structure of a physical asset and its movement over time, and the data stream is acquired from virtual sensors attached to a corresponding virtual structure of the virtual asset in virtual space.

11. The method of claim 8, wherein the receiving comprising detecting time-series damage information from one or more sensors positioned on predefined hot spots on the structure of the asset.

12. The method of claim 8, wherein the determining comprises determining the accumulated damage of the asset for the new stress cycle based on residual damage information of the asset that has already been determined from a previous extrema in the received data corresponding to a previously received stress cycle.

13. The method of claim 8, wherein the outputting comprises at least one of continuously outputting the information concerning the accumulated damage and outputting the information concerning the accumulated damage in response to a measure of the accumulated damage exceeding a threshold level.

14. A non-transitory computer readable medium having stored therein instructions that when executed cause a computer to perform a method for determining real-time damage of an asset, the method comprising:
 receiving a data stream acquired from a structure of the asset that is monitored;
 iteratively determining an accumulated damage amount to the asset using a sliding time window in which damage is incrementally calculated in time one stress cycle at a time within the received data stream, wherein for each iteration, the determining comprises
  identifying a start and stop point of a new stress cycle in time corresponding to a respective minima and maxima of a new extrema in the received data stream,
  determining a current increment of damage to the asset within the new stress cycle that occurs between the minima and maxima of the new extrema, and
  determining an accumulated damage for the iteration based on the determined current increment of damage for the new stress cycle added to residual damage of the asset which is previously determined during one or more previous iterations corresponding to one or more previously received stress cycles; and
 outputting information concerning the accumulated damage amount of the asset for display on a display device.

15. The non-transitory computer-readable medium of claim 14, wherein the asset comprises a physical asset including at least one of a wind turbine, a crane, a winch, an oil platform, and a bridge.

16. The non-transitory computer-readable medium of claim 14, wherein the asset comprises a virtual asset which comprises a virtual representation of a physical structure of the physical asset and its movement over time, and the data stream is acquired from virtual sensors attached to a corresponding virtual structure of the virtual asset.

17. The non-transitory computer-readable medium of claim 14, wherein the determining comprises determining the accumulated damage of the asset for the new stress cycle based on residual damage information of the asset that has already been determined from a previous extrema in the received data corresponding to a previously received stress cycle.

* * * * *